United States Patent [19]
Fritz et al.

[11] Patent Number: 5,535,912
[45] Date of Patent: Jul. 16, 1996

[54] METAL LINER FOR A FIBER-REINFORCED PLASTIC TANK

[75] Inventors: Peter J. Fritz, Mequon; David A. Tice, Menomonee Falls, both of Wis.; Lester R. Rabb, Ward, Ark.

[73] Assignee: A. O. Smith Corporation, Milwaukee, Wis.

[21] Appl. No.: 214,931

[22] Filed: Mar. 17, 1994

[51] Int. Cl.$^6$ ........................................... B22F 5/00
[52] U.S. Cl. ........................ 220/403; 220/442; 220/470
[58] Field of Search .................................. 220/403, 470, 220/581, 588, 589, 590, 403, 442, 470

[56] References Cited

U.S. PATENT DOCUMENTS

| | | | |
|---|---|---|---|
| 2,009,606 | 7/1935 | Diffenderfer | 220/1 |
| 2,144,945 | 1/1939 | Sutton | 220/71 |
| 2,316,437 | 4/1943 | Kercher | 220/63 |
| 2,796,157 | 6/1957 | Ginsburg | 189/34 |
| 3,064,344 | 11/1962 | Arne | 29/421 |
| 3,446,385 | 5/1969 | Ponemon | 220/590 |
| 3,510,278 | 5/1970 | Alleaume | 220/442 X |
| 3,819,466 | 6/1974 | Winfield et al. | 161/89 |
| 3,867,199 | 2/1975 | Dunlop et al. | 136/28 |
| 3,877,126 | 4/1975 | Deutschmann et al. | 29/156.4 |
| 3,950,585 | 4/1976 | Hale | 428/181 |
| 3,956,543 | 5/1976 | Strangeland | 220/442 X |
| 3,959,018 | 5/1976 | Dunlop et al. | 136/86 |
| 4,112,199 | 9/1978 | Dunlop et al. | 429/29 |
| 4,176,761 | 12/1979 | Göbl | 220/438 |
| 4,348,442 | 9/1982 | Figge | 428/72 |
| 4,351,870 | 9/1982 | English, Jr. | 428/174 |
| 4,366,917 | 1/1983 | Kotcharian | 220/422 |
| 4,421,827 | 12/1983 | Phillips | 428/418 |
| 4,495,237 | 1/1985 | Patterson | 428/178 |
| 4,585,711 | 4/1986 | Valdyanathan | 429/42 |
| 4,594,281 | 6/1986 | Haraga et al. | 428/172 |
| 4,769,968 | 9/1988 | Davis et al. | 52/814 |
| 4,917,933 | 4/1990 | Schluter | 428/99 |
| 4,923,769 | 5/1990 | Jones et al. | 429/101 |
| 5,033,593 | 7/1991 | Kazuhito | 188/377 |
| 5,047,280 | 9/1991 | Bach | 428/182 |
| 5,128,195 | 7/1992 | Hegedus | 428/174 |
| 5,133,652 | 7/1992 | Abe et al. | 418/178 |
| 5,139,838 | 8/1992 | Baum | 428/72 |
| 5,292,027 | 3/1994 | Lueke | 220/470 |

Primary Examiner—Steven M. Pollard
Attorney, Agent, or Firm—James Earl Lowe, Jr.

[57] ABSTRACT

A metal clad article comprising:

a cured layer of fiber-reinforced plastic; and a metal facing on the plastic layer, the metal facing having a length, a width and a thickness such that the length and the width are substantially greater than the thickness, and the metal facing being formed into a three-dimensional pattern repeating in the direction of the length and in the direction of the width and having a period of repetition in said length and width directions of at least twice the thickness, and the pattern having a depth, in the direction of the thickness, of at least twice the thickness.

18 Claims, 3 Drawing Sheets

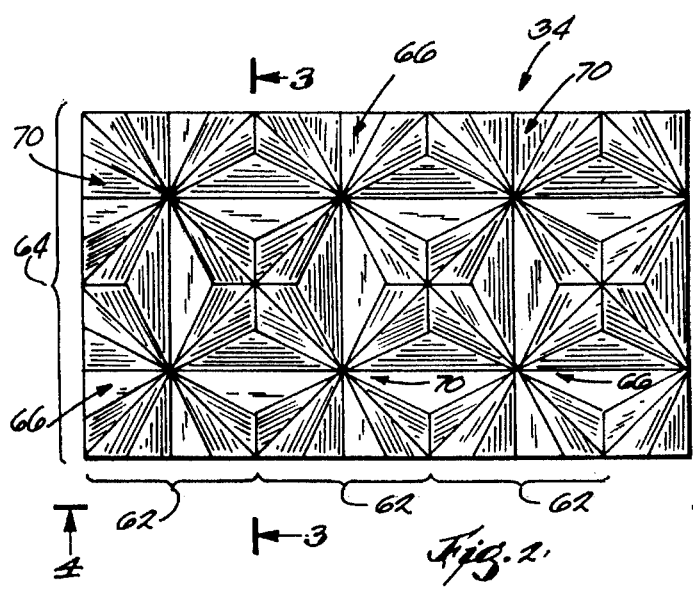
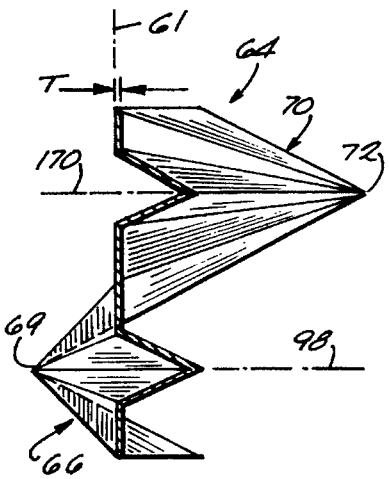
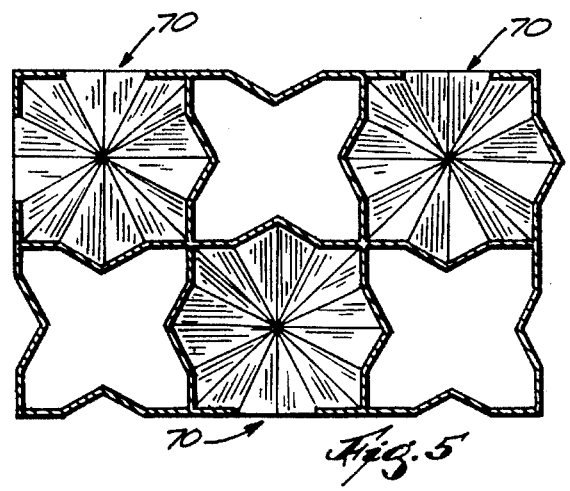
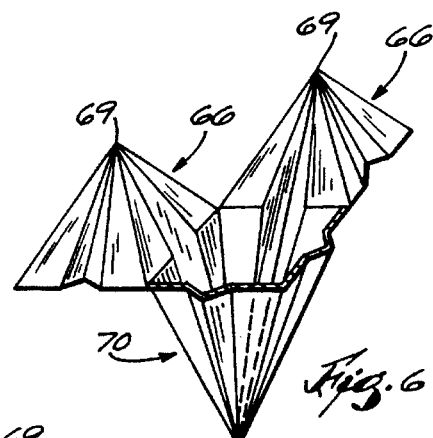
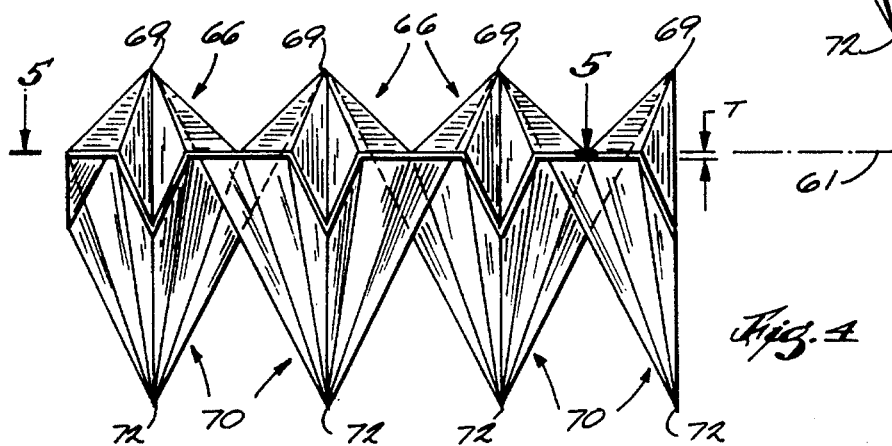

5,535,912

METAL LINER FOR A FIBER-REINFORCED PLASTIC TANK

BACKGROUND OF THE INVENTION

The invention relates to metal clad articles, and more particularly to fiber-reinforced plastic tanks with metal liners.

Compressed or pressurized gases are typically contained in a generally cylindrical tank. The tank ends are generally rounded and one of the ends is sealed while the other of the ends forms an outlet or connecting stud through which the gas can enter or exit the tank. The tank is typically formed from steel. It is also known in the art to provide a metal liner adjacent the inner surface of a a fiber-reinforced plastic tank to seal the tank against loss of the gas from the tank. Without a metal liner, the pressurized gas can diffuse through the fiber-reinforced plastic shell. Since steel is four times as heavy as fiber-reinforced plastic, it is desirable to use more fiber-reinforced plastic than steel.

It is also known in the art to provide an aircraft fuel tank with a linearly corrugated metal liner as shown in U.S. Pat. No. 2,144,945. The corrugated metal liner provides support to the shell of the tank. It is also known in the art to provide a resin layer between the tank and the liner, as shown in U.S. Pat. No. 4,421,827.

Typically, the material forming the metal liner has a high modulus of elasticity relative to the modulus of elasticity of the fiber-reinforced plastic shell (greater than four times). Thus, the liner is much more stiff than the fiber-reinforced plastic shell. If a force is applied to the shell, as for example, when the tank is accidently dropped, the shell may elongate more than the liner can elongate without rupturing. In order to prevent rupturing of the liner, a corrugation can be used so that the liner elongates with the shell with a movement like an accordion bellows.

However, known corrugations repeat in only one lengthwise direction, thus leaving a continuous or unbroken grid of material in the widthwise direction which cannot elongate in accordion-type fashion. Therefore, when the structure supporting the liner is loaded, the liner material can rupture in tension or buckle in compression along the unbroken linear portions of the liner and before the fiber-reinforced plastic shell is utilized to its yield strength or ultimate strength. To overcome this problem, a thick (about one fourth inch) liner is used, resulting in a much heavier tank.

SUMMARY OF THE INVENTION

The invention provides an improved metal facing for a layer of low modulus of elasticity material, such as fiber-reinforced plastic, and more particularly an improved liner for a fiber-reinforced plastic tank.

Specifically, the invention provides a tank for containing a compressed gas. The tank includes a fiber-reinforced plastic shell having an inner surface and a metal facing or liner on the inner surface. When laid flat, the metal facing defines a plane and has a length, a width and a thickness such that the length and the width are substantially greater than the thickness. The metal facing is formed into a three-dimensional repetitive pattern, preferably a fanfold pattern, which repeats in the direction of the length and in the direction of the width. The pattern has a period (the length of each repeating section) of at least twice the thickness. The pattern also has a depth which is at least twice the thickness of the metal facing. The pattern includes a plurality of peaks extending above the plane. Each peak has an apex, and a plurality of facets. The peaks are generally identical in size and in shape. The pattern also includes a plurality of valleys extending below the plane. The valleys each have a lowpoint and include a plurality of facets. The valleys are also generally identical in size and in shape.

The peaks and the valleys are arranged in an alternating pattern so that each of the peaks is surrounded by a plurality of adjacent valleys. Specifically, each peak is generally pyramidal and has four facets and each valley is generally pyramidal and has four facets. Each peak facet is aligned with a valley facet to form a facet pair. Each facet pair has therein an undulation extending from the peak apex to the valley lowpoint to assure that there is no continuous grid of material in a single plane so that stretching forces applied to the article cause fanfold movement of the peaks, of the valleys and of the undulations to resist rupturing of the metal facing.

One of the principle features of the invention is the provision of a metal clad article, such as a compressed natural gas tank, with the article using substantially less metal than in the prior art (one twenty fifth as much).

Other features and advantages of the invention will become apparent to those skilled in the art upon review of the following detailed description, claims and drawings.

DESCRIPTION OF THE DRAWINGS

FIG. 3 is a view taken along line 3—3 in FIG. 2 showing a section of the liner, and a gel-coat between the liner and the tank.

FIG. 4 is a view taken along line 4—4 in FIG. 2.

FIG. 5 is a view taken along line 5—5 in FIG. 4.

FIG. 6 is an enlarged perspective view of a portion of the liner.

FIG. 7 is an enlarged plan view of the liner section shown in FIG. 3.

FIG. 9 is an enlarged portion of FIG. 8.

Figure 8:
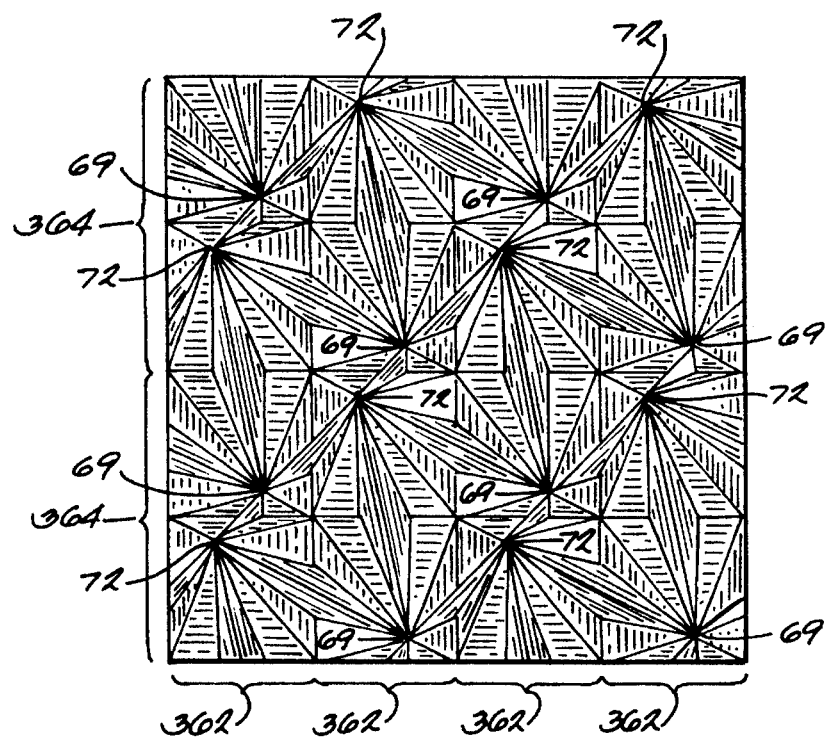
FIG. 8 is an enlarged, partial plan view of a liner for a gas tank that is an alternative embodiment of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS

Figure 1:
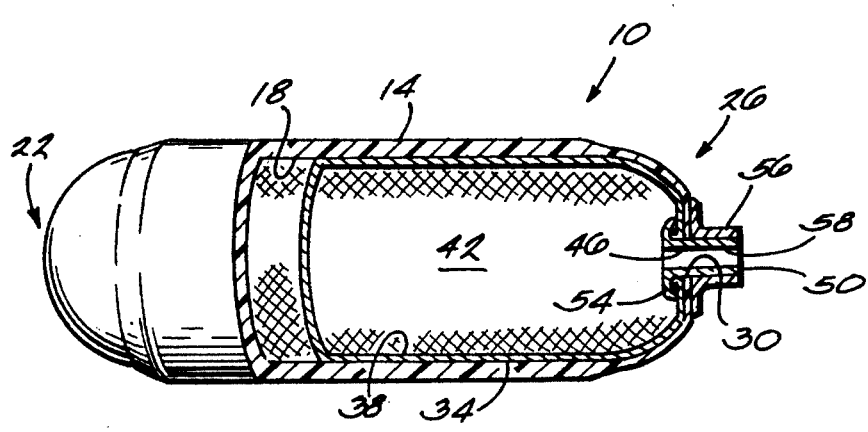
FIG. 1 is a side elevational view of a gas tank embodying the invention with portions cut away to show the liner of the tank.

A tank 10 embodying the invention is shown in FIG. 1. While the illustrated embodiment of the invention is a tank for containing a compressed gas, it should be understood that the invention is applicable to any metal clad article including a first low modulus of elasticity layer, such as a layer of fiber-reinforced plastic, and a metal facing on the plastic layer.

The tank 10 includes a generally cylindrical fiber-reinforced plastic shell 14. The shell 14 has an inner surface 18 and includes opposite ends 22 and 26. One of the ends 22 is sealed while the other of the ends 26 includes an opening 30.

The tank 10 also includes a metal facing or liner 34 which is adjacent the inner surface 18 and which provides a vapor barrier to prevent diffusion of the compressed gas through the cylindrical shell 14. The liner 34 includes an inner surface 38 defining a chamber 42 for containing the gas in the tank 10. The liner 34 includes an opening 46 which is adjacent the shell end 26 and which communicates between the shell opening 30 and the chamber 42. As shown in FIG. 1, an annular conduit 50 extends through the openings 30 and 46 and has a lip 54 overlapping the inner surface 38 of the liner 34 adjacent the opening 46. The conduit 50 is externally threaded. An annular fitting or stud 56 is threaded onto the conduit 50 to secure the liner 34 and the shell 14 between the lip 54 and the fitting 56 and to seal the openings 30 and 46 against the conduit 50. The conduit 50 forms an outlet 58 through which gas may enter and exit the chamber 42. The conduit 50 is also internally threaded to receive a fitting or connector (not shown).

In the preferred embodiment, an intermediate layer 59 of material (see FIG. 3) is added between the liner 34 and the shell 14 to allow for greater out-of plane straining between the liner and the shell. In the case of the metal corrugated liner overwrapped with fiberglass, a gel-coat is applied to the liner prior to the fiberglass winding. The gel-coat is formulated for high elongation, such as by using a flexibilized epoxy, a rubber, a polyurethane, or the like. This gel-coat allows the corrugated liner 34 to flex out-of-plane without separation from the fiberglass shell 14. The gel-coat also allows the corrugated liner to flex in the plane of strain movement of the shell.

Figure 2:
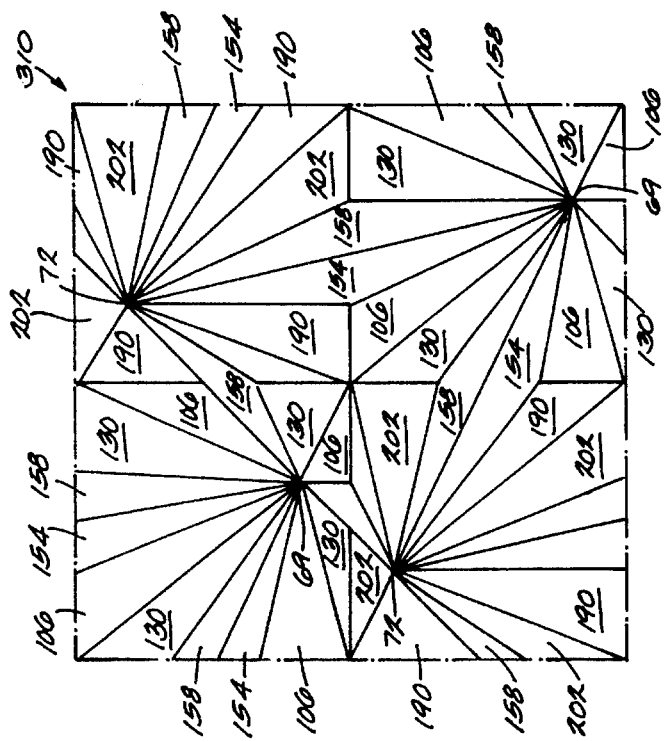
FIG. 2 is an enlarged, partial plan view of the liner laid flat.
Figure 1:
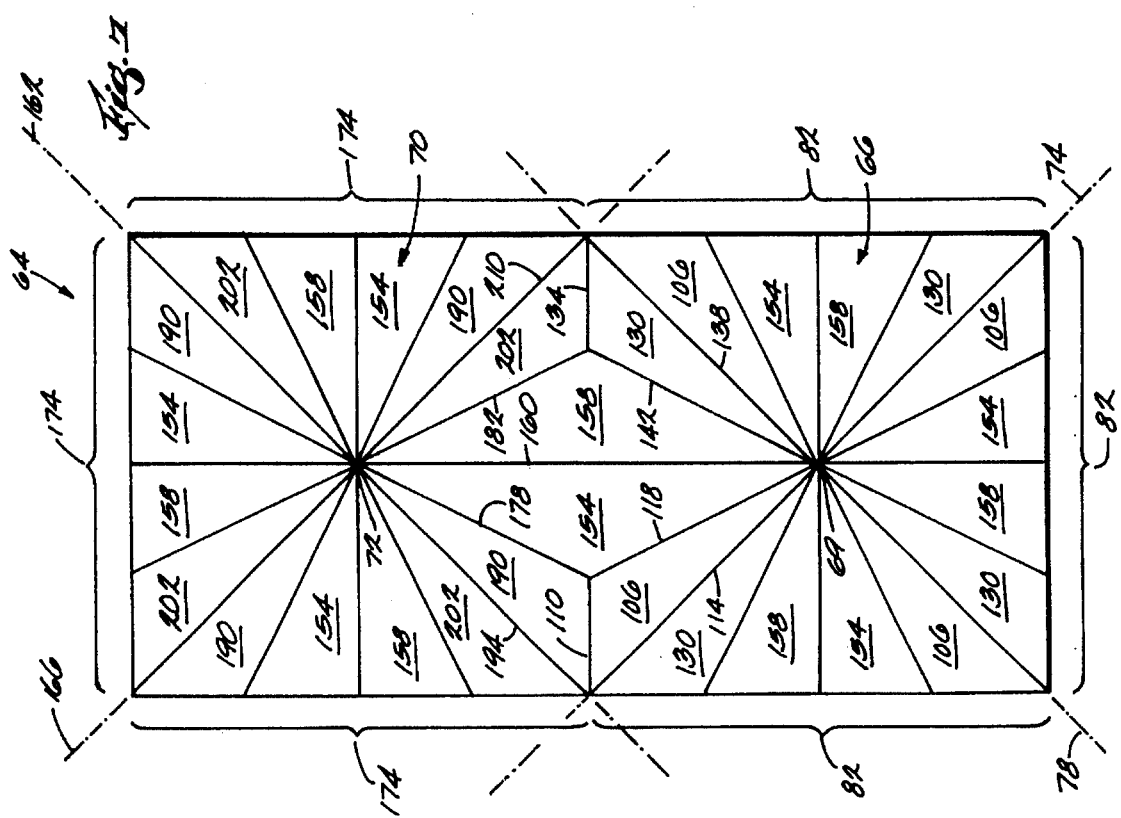

When laid flat, as shown in FIGS. 2–7, the liner 34 has a length (in a direction from right to left in FIG. 2), a width (in a direction from top to bottom in FIG. 2) and a thickness "T" (in a direction from left to right in FIG. 3 and top to bottom in FIG. 4) and defines a plane 61 (shown as a dashed line in FIGS. 3 and 4). As shown in the drawings, the length and the width are much greater than the thickness. The liner 34 is corrugated in a three-dimensional pattern which repeats in the direction of both the length and the width. The pattern is preferably a fanfold pattern. The period of the pattern in both directions is preferably at least twice the thickness "T" of the liner. In the illustrated construction, the period is much greater than twice the thickness "T" of the liner. In the preferred embodiment, the liner is about 0.01 inches thick. It should be noted that FIG. 2 shows only a portion of the liner 34, the portion being one period wide and 1.75 periods long. The actual liner is much wider and much longer.

Referring to FIG. 2, the liner 34 can be viewed as being made of a plurality of parallel strips 62 extending in the direction of the width (from top to bottom in FIG. 2), with each strip 62 having a width (from left to right in FIG. 2) equal to one half of the period of the pattern. Each strip 62 is many periods long, although the strip portions shown in FIG. 2 are only one period long. Three and one-half strips are shown in FIG. 2. Each strip is comprised of identical repeating sections 64, with each section 64 having a length (from top to bottom in FIG. 2) equal to the period of the pattern. As shown specifically in FIG. 3, each section 64 includes a peak 66 extending above (to the left in FIG. 3) the plane 61 to an apex 69. The section 64 also includes an adjacent valley 70 which extends below (to the right in FIG. 3) the plane 61 to a lowpoint 72. Each strip 62 is offset from the adjacent strips by one-half of a period so that each peak 66 is bounded by four adjacent valleys 70 and each valley 70 is in turn bounded by four adjacent peaks 66. In the preferred embodiment, the gel-coat 59 completely fills all of the peaks and valleys and is located in a thin layer between the apexs and lowpoints and the fiberglass reinforced plastic layers.

As shown in FIG. 7, each peak 66 is symmetrical about a plane 74 perpendicular to plane 61 and about a plane 78 perpendicular to planes 61 and 74. The planes 74 and 78 divide the peak 66 into four quarter-sections 82 (three are numbered in FIG. 7) and intersect along an axis 98 (FIG. 3) extending through the apex 69. The quarter-sections 82 are identical, and therefore only one quarter-section 82 will be described in detail.

As best shown in FIG. 7, the quarter-section 82 includes a generally planar facet 106. The facet 106 is triangular and is bounded by segments 110, 114 and 118. The segment 110 is in the plane 61. Segments 114 and 118 extend above the plane and from the segment 110 to the apex 69. The quarter-section 82 also includes a generally planar facet 130 that is co-planar with the facet 106. The facet 130 is also triangular and is bounded by segments 134, 138 and 142. The segment 134 is in the plane 61 and is co-linear with segment 110. The segments 138 and 142 extend above the plane 61 and from the segment 134 to the apex 69. The quarter-section 82 also includes generally planar facets 154 and 158. The facets 154 and 158 are both triangular and are mirror images of one another. The facets 154 and 158 are connected along a common segment 160 which extends from the apex 69 to the lowpoint 72 so that the facets 154 and 158 form portions of the peak 66 as well as portions of the valley 70 in a manner which will be described below in greater detail. As shown in FIG. 7, the facet 154 is in part bounded by segment 118 and the facet 158 is in part bounded by segment 142. The facets 106 and 130 can be viewed as forming a side of the peak 66 with the facets 154 and 158 forming an undulation in the side.

Referring still to FIG. 7, each valley 70 is generally symmetrical about a plane 162 perpendicular to the plane 61 and parallel to the plane 78. The valley 70 is also generally symmetrical about a plane 166 perpendicular to planes 162 and 61. The planes 162 and 166 intersect along an axis 170 (FIG. 3) extending through the lowpoint 72. The planes 162 and 166 divide the valley 70 into four quarter-sections 174 (three are numbered in FIG. 7). The quarter-sections 174 are identical and only one quarter-section 174 will be described in detail.

As shown in FIG. 7, the facets 154 and 158 form a portion of the quarter-section 174 of the valley 70. In the quarter-section 174, the facet 154 is bounded by segment 178 which extends between segments 118 and 160 and extends from the plane 61 to the lowpoint 72. Also in the quarter-section 174, the facet 158 is bounded by segment 182 which extends between segments 142 and 160 and extends from the plane 61 to the lowpoint 72. The quarter-section 174 also includes a generally planar facet 190. The facet 190 is triangular and is bounded by segments 110, 178 and 194. The facet 190 extends downwardly from the segment 110 to the lowpoint 72. The quarter-section 174 also includes a generally planar facet 202 co-planar with the facet 190. The facet 202 is triangular and is bounded by segments 134, 182 and 210. The facets 190 and 202 can be viewed as forming a side of the valley 70 with the facets 154 and 158 forming an undulation in the side.

Preferably, as shown in the drawings, the apexes 69 are equidistant from the plane 61 and the lowpoints 72 are equidistant from the plane 61. In the illustrated construction, the peaks 66 and valleys 70 are shaped differently so that the distance from an apex 69 to the plane 61 is less than the distance from a lowpoint 72 to the plane 61.

In operation, a sheet of corrugated liner material is rolled into the shape of a cylinder. A series of longitudinal cuts are made in the liner material adjacent the ends to form flaps of liner material. The flaps are folded toward the center of the cylinder and are welded together to close the ends. The opening 46 is formed at one end and the fiber-reinforced plastic shell 14 is formed around the liner 34. If the shell 14 is subjected to a force that causes deformation of the shell 14, then the liner 34 will expand or contract in fanfold or accordion-type movement to resist rupturing of the liner 34.

Illustrated in FIGS. 8 and 9 of the drawings is a portion of a liner 310 for a gas tank that is an alternative embodiment of the invention. The liner 310 is similar to the liner 34, and like parts are identified with like reference numerals. As shown in FIG. 8, the liner 310 has a three-dimensional pattern having parallel strips 362 with repeating sections 364. The sections 364 differ from the sections 64 in that the apexes 69 and lowpoints 72 are not centrally located. The apexes 69 and lowpoints 72 are slightly offset so as to form a repeating three-dimensional pattern of asymmetrical peaks 66 and asymmetrical valleys 70.

Various features of the invention are set forth in the following claims.

What is claimed is:

1. A metal clad article comprising:

a first layer of material; and a metal having a modulus of elasticity of greater than four times said first layer and facing on said first layer, said metal facing having a length, a width and a thickness such that said length and said width are substantially greater than said thickness, and said metal facing being formed into a three-dimensional pattern repeating in the direction of said length and in the direction of said width and having a period of repetition in said length and width directions of at least twice said thickness, and said pattern having a depth, in the direction of said thickness, of at least twice said thickness, and wherein said pattern includes a plurality of peaks and valleys, each of said peaks and valleys including a plurality of at least sixteen facets, each of said peaks having a single highest most point and each of said valleys having a single lowest most point.

2. A metal clad article as set forth in claim 1 wherein said first layer comprises a cured layer of fiber-reinforced plastic, and wherein said metal clad article further includes a gel-coat between said plastic layer and said metal.

3. A metal clad article as set forth in claim 1 wherein said metal facing, when laid flat, defines a plane, wherein said pattern includes said plurality of peaks extending above said plane and said plurality of valleys extending below said plane, and wherein said peaks and said valleys are arranged in alternating pattern.

4. A metal clad article as set forth in claim 3 wherein said alternating pattern alternates in the direction of said length and in the direction of said width.

5. A metal clad article as set forth in claim 3 wherein said peaks are shaped differently from said valleys.

6. A metal clad article as set forth in claim 3 wherein each of said peaks includes an apex, wherein each of said valleys includes a lowpoint, wherein said apexes are equidistant from said plane and wherein said lowpoints are equidistant from said plane.

7. A metal clad article as set forth in claim 3 wherein each of said peaks has said plurality of facets, wherein each of said valleys has said plurality of facets, and wherein each peak facet is adjacent a corresponding valley facet to form a facet pair.

8. A metal clad article as set forth in claim 7 wherein each facet pair has therein an undulation including a first surface extending from said apex to said lowpoint and a second surface extending from said apex to said lowpoint, and wherein said first surface and said second surface intersect to form a line extending from said apex to said lowpoint.

9. A metal clad article as set forth in claim 1 wherein said three-dimensional pattern is a fanfold pattern.

10. A tank for containing a compressed gas, said tank comprising:

a shell of fiber-reinforced plastic having an inner surface; and a metal facing on said inner surface, said metal facing having, when laid flat, a length, a width and a thickness such that said length and said width are substantially greater than said thickness, and said metal facing being formed into a three-dimensional pattern repeating in the direction of said length and in the direction of said width and having a period of repetition in said length and width directions of at least twice said thickness, and said pattern having a depth, in the direction of said thickness, of at least twice said thickness, and wherein said pattern includes a plurality of peaks and valleys, each of said peaks and valleys including a plurality of at least sixteen facets, each of said peaks having a single highest most point and each of said valleys having a single lowest most point.

11. A tank as set forth in claim 10 wherein said metal facing, when laid flat, defines a plane, wherein said pattern includes said plurality of peaks extending above said plane and said plurality of valleys extending below said plane, and wherein said peaks and said valleys are arranged in an alternating pattern.

12. A tank as set forth in claim 11 wherein said alternating pattern alternates in the direction of said length and in the direction of said width.

13. A tank as set forth in claim 11 wherein said peaks are shaped differently from said valleys.

14. A tank as set forth in claim 11 wherein each of said peaks includes an apex, wherein each of said valleys includes a lowpoint, wherein said apexes are equidistant from said plane and wherein said lowpoints are equidistant from said plane.

15. A tank as set forth in claim 11 wherein each of said peaks has said plurality of facets, wherein each of said valleys has said plurality of facets, and wherein each peak facet is adjacent a corresponding valley facet to form a facet pair.

16. A tank as set forth in claim 15 wherein each facet pair has therein an undulation including a first surface extending from said apex to said lowpoint and a second surface extending from said apex to said lowpoint, and wherein said first surface and said second surface intersect to form a line extending from said apex to said lowpoint.

17. A tank as set forth in claim 10 wherein said three-dimensional pattern is a fanfold pattern.

18. A tank for containing a compressed gas, said tank comprising: a shell of fiber-reinforced plastic having an inner surface; and a metal facing on said inner surface, said metal facing, when laid flat, defining a plane and having a length, a width and a thickness such that said length and said width are substantially greater than said thickness, and said metal facing being formed into a three-dimensional pattern, said pattern repeating in the direction of said length and in the direction of said width, said pattern having a period of repetition in said length and width directions of at least twice said thickness, said pattern having a depth, in the direction of said thickness, of at least twice said thickness, and said pattern including a plurality of peaks extending above said plane and each having an apex and a plurality of at least sixteen facets, and a plurality of valleys extending below said plane and each having a low point and a plurality of at least sixteen facets, each of said peaks having a single highest most point and each of said valleys having a single lowest most point, and said peaks and said valleys alternating so that each of said peaks is surrounded by a plurality of adjacent valleys, and each peak facet being adjacent a corresponding valley facet to form a facet pair, each facet pair having therein an undulation including a first surface extending from said apex to said low point and a second surface extending from said apex to said low point, said first surface and said second surface intersecting to form a line extending from said apex to said low point.

* * * * *